United States Patent
Sohm et al.

(10) Patent No.: US 7,992,049 B2
(45) Date of Patent: Aug. 2, 2011

(54) MONITORING OF MEMORY AND EXTERNAL EVENTS

(75) Inventors: Oliver P. Sohm, Toronto (CA); Gary L. Swoboda, Sugar Land, TX (US); Manisha Agarwala, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 592 days.

(21) Appl. No.: 11/383,473

(22) Filed: May 15, 2006

(65) Prior Publication Data

US 2006/0259751 A1    Nov. 16, 2006

Related U.S. Application Data

(60) Provisional application No. 60/681,427, filed on May 16, 2005, provisional application No. 60/681,497, filed on May 16, 2005.

(51) Int. Cl.
*G06F 11/00* (2006.01)

(52) U.S. Cl. .......................................... 714/45; 714/39

(58) Field of Classification Search .................... 714/45, 714/30, 33, 37, 38.1, 38.11, 38.12, 38.13, 714/39, 48
See application file for complete search history.

(56) References Cited

U.S. PATENT DOCUMENTS

| | | | | |
|---|---|---|---|---|
| 5,737,520 | A * | 4/1998 | Gronlund et al. | 714/39 |
| 5,740,355 | A * | 4/1998 | Watanabe et al. | 714/45 |
| 5,748,881 | A * | 5/1998 | Lewis et al. | 714/47 |
| 6,057,839 | A * | 5/2000 | Advani et al. | 715/784 |
| 6,112,298 | A * | 8/2000 | Deao et al. | 712/227 |
| 6,507,923 | B1 * | 1/2003 | Wall et al. | 714/712 |
| 6,553,513 | B1 * | 4/2003 | Swoboda et al. | 714/28 |
| 6,606,671 | B1 * | 8/2003 | McNamer et al. | 710/18 |
| 6,654,819 | B1 * | 11/2003 | Comisky et al. | 710/22 |
| 6,658,416 | B1 * | 12/2003 | Hussain et al. | 707/10 |
| 7,039,644 | B2 * | 5/2006 | Hind et al. | 707/101 |
| 7,069,176 | B2 * | 6/2006 | Swaine et al. | 702/176 |
| 7,395,131 | B2 * | 7/2008 | Funk | 700/108 |
| 7,788,538 | B2 * | 8/2010 | Swoboda | 714/38.1 |
| 2002/0111785 | A1 * | 8/2002 | Swoboda et al. | 703/28 |
| 2002/0133794 | A1 * | 9/2002 | Kanapathippillai et al. | 716/4 |
| 2002/0194570 | A1 * | 12/2002 | Birru et al. | 714/792 |
| 2004/0064685 | A1 * | 4/2004 | Nguyen et al. | 712/227 |
| 2004/0210749 | A1 * | 10/2004 | Biles | 712/240 |
| 2004/0243662 | A1 * | 12/2004 | Mastro | 709/200 |
| 2006/0184845 | A1 * | 8/2006 | Hayashi | 714/701 |

* cited by examiner

*Primary Examiner* — Robert W Beausoliel, Jr.
*Assistant Examiner* — Elmira Mehrmanesh
(74) *Attorney, Agent, or Firm* — Robert D. Marshall, Jr.; W. James Brady; Frederick J. Telecky, Jr.

(57) ABSTRACT

A system comprises a circuit configured to execute instructions and output event data corresponding to the execution of the instructions. The system also comprises a monitoring device coupled to the circuit. The monitoring device receives information about said event data. The event data comprises event data selected from a group consisting of memory events and external events.

20 Claims, 6 Drawing Sheets

*FIG. 5B*
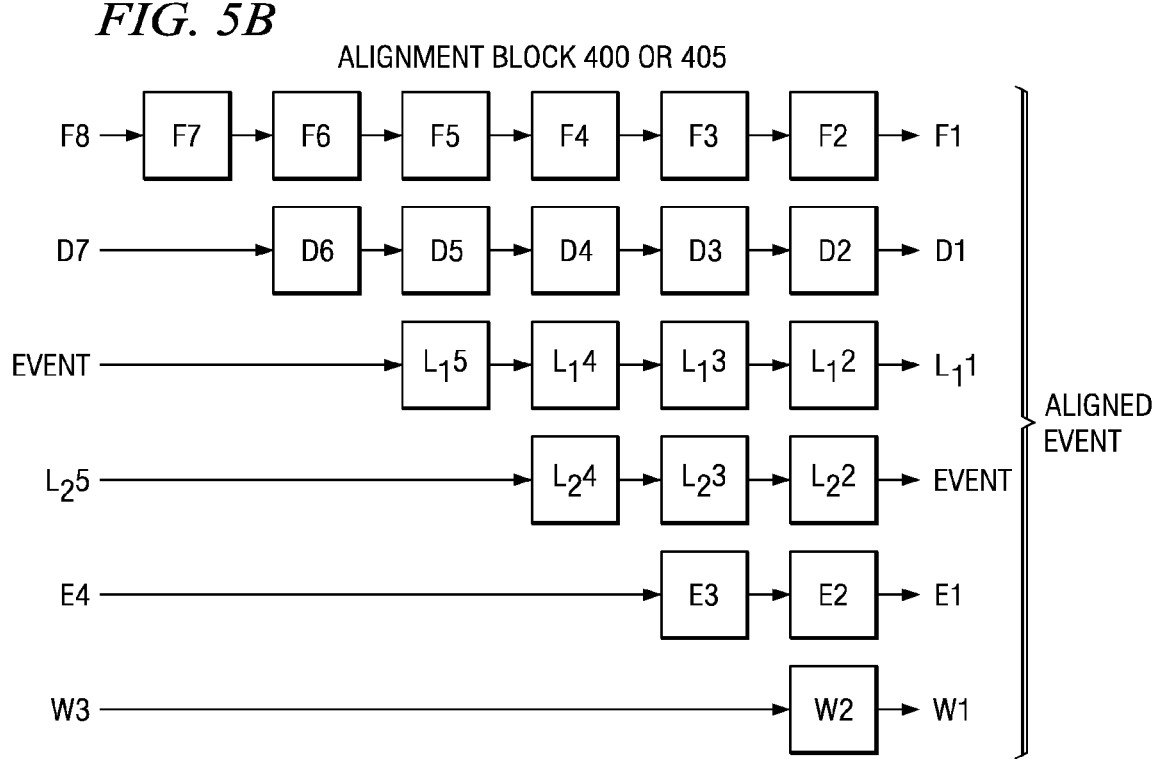
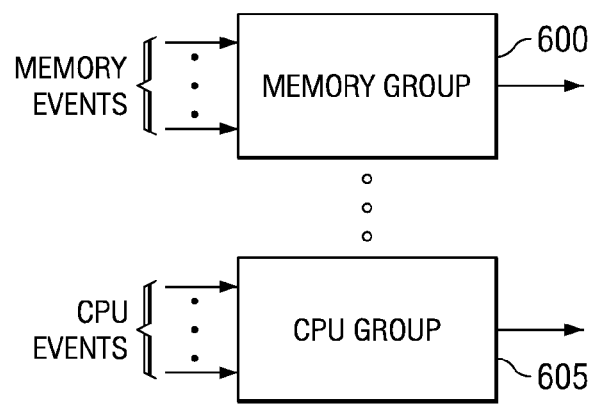
*FIG. 6*

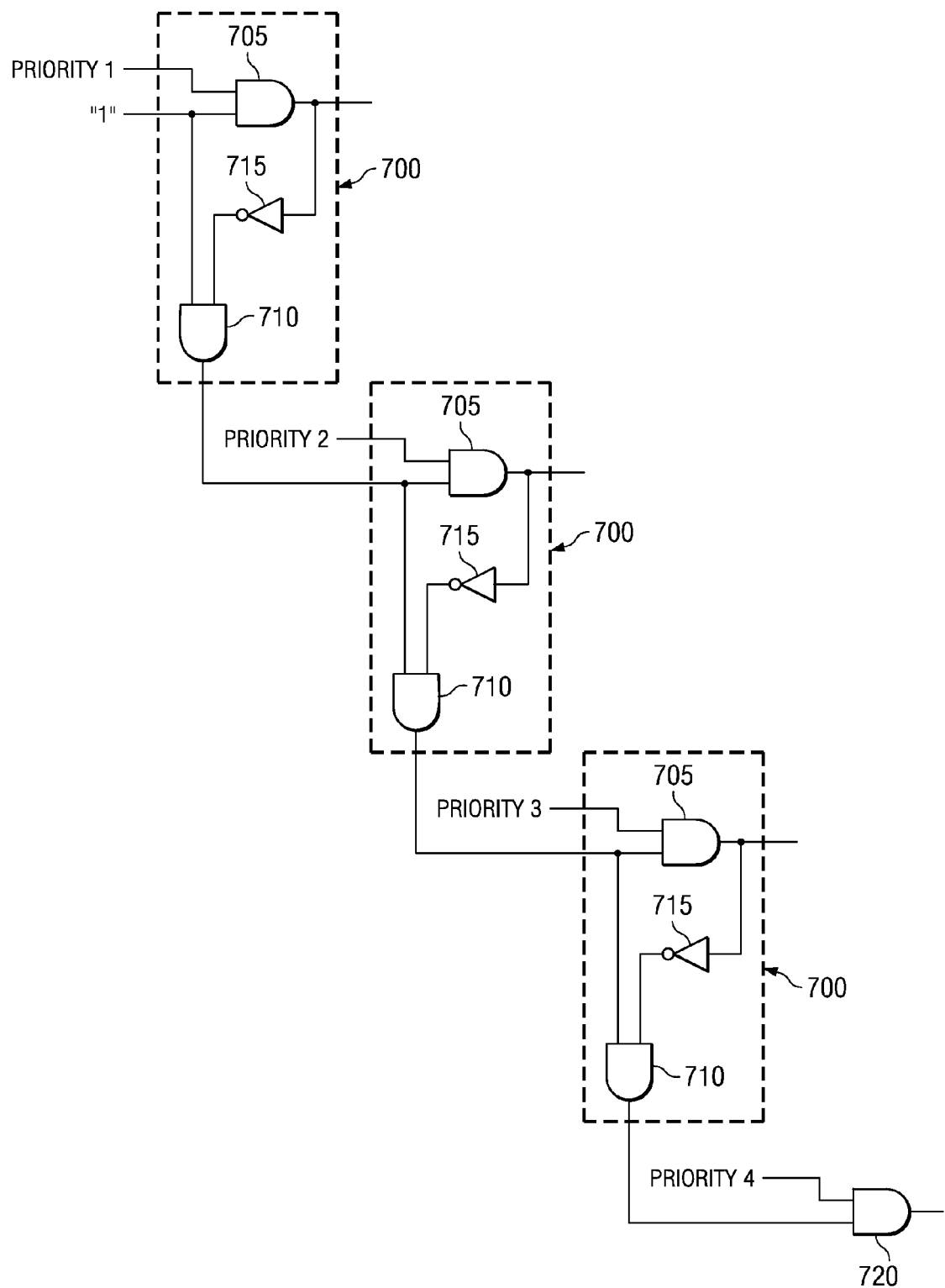

US 7,992,049 B2

MONITORING OF MEMORY AND EXTERNAL EVENTS

CROSS-REFERENCE TO RELATED APPLICATIONS

This application claims the benefit of U.S. Provisional Application Ser. No. 60/681,497, filed May 16, 2005, titled "Emulation/Debugging With Real-Time System Monitoring," and U.S. Provisional Application Ser. No. 60/681,427, filed May 16, 2005, titled "Debugging Software-Controlled Cache Coherence," both of which are incorporated by reference herein as if reproduced in full below.

The following applications contain subject matter related to the subject matter of this application, and are incorporated herein by reference:

Ser. Nos. 11/383,361 11/383,389 11/383,464 11/383,465 11/383,466 11/383,472 11/383,438 11/383,433

BACKGROUND

Integrated circuits are ubiquitous in society and can be found in a wide array of electronic products. Regardless of the type of electronic product, most consumers have come to expect greater functionality when each successive generation of electronic products are made available because successive generations of integrated circuits offer greater functionality such as faster memory or microprocessor speed. Moreover, successive generations of integrated circuits that are capable of offering greater functionality are often available relatively quickly. For example, Moore's law, which is based on empirical observations, predicts that the speed of these integrated circuits doubles every eighteen months. As a result, integrated circuits with faster microprocessors and memory are often available for use in the latest electronic products every eighteen months.

Although successive generations of integrated circuits with greater functionality and features may be available every eighteen months, this does not mean that they can then be quickly incorporated into the latest electronic products. In fact, one major hurdle in bringing electronic products to market is ensuring that the integrated circuits, with their increased features and functionality, perform as desired. Generally speaking, ensuring that the integrated circuits will perform their intended functions when incorporated into an electronic product is called "debugging" the electronic product. Also, determining the performance, resource utilization, and execution of the integrated circuit is often referred to as "profiling". Profiling is used to modify code execution on the integrated circuit so as to change the behavior of the integrated circuit as desired. The amount of time that debugging and profiling takes varies based on the complexity of the electronic product. One risk associated with the process of debugging and profiling is that it delays the product from being introduced into the market.

To prevent delaying the electronic product because of delay from debugging and profiling the integrated circuits, software based simulators that model the behavior of the integrated circuit are often developed so that debugging and profiling can begin before the integrated circuit is actually available. While these simulators may have been adequate in debugging and profiling previous generations of integrated circuits, such simulators are increasingly unable to accurately model the intricacies of newer generations of integrated circuits. Further, attempting to develop a more complex simulator that copes with the intricacies of integrated circuits with cache memory takes time and is usually not an option because of the preferred short time-to-market of electronic products. Unfortunately, a simulator's inability to effectively model integrated circuits results in the integrated circuits being employed in the electronic products without being debugged and profiled fully to make the integrated circuit behave as desired.

SUMMARY

Disclosed herein is a system and method monitoring various memory events and external events. In at least one embodiment, a system comprises a circuit configured to execute instructions and output event data corresponding to the execution of the instructions. The system also comprises a monitoring device coupled to the circuit. The monitoring device receives information about said event data. The event data comprises event data selected from a group consisting of memory events and external events.

In accordance with another embodiment, a method comprises executing instructions on a circuit, determining event data corresponding to the execution of the instruction, and a monitoring device receiving the event data. The event data comprises event data selected from a group consisting of memory events and external events.

In accordance with yet another embodiment, a circuit comprises a memory subsystem and logic that receives memory event data from the memory subsystem and receives external event data. The circuit also comprises an interface coupled to the logic. The memory event data and the external event data are provided by the interface to an external monitoring system coupled to the circuit. The memory event data provides information about memory events associated with said memory subsystem and the external event data provide external events associated with the circuit aside from the memory subsystem.

BRIEF DESCRIPTION OF THE DRAWINGS

For a detailed description of exemplary embodiments of the invention, reference will now be made to the accompanying drawings in which:

FIG. 5B depicts the operation of the alignment blocks;

FIG. 6 depicts a preferred implementation of either a priority encoder or a translator;

FIG. 7A depicts an implementation of any of the groups shown in FIG. 6 for prioritizing the input events;

DETAILED DESCRIPTION

Figure 1:
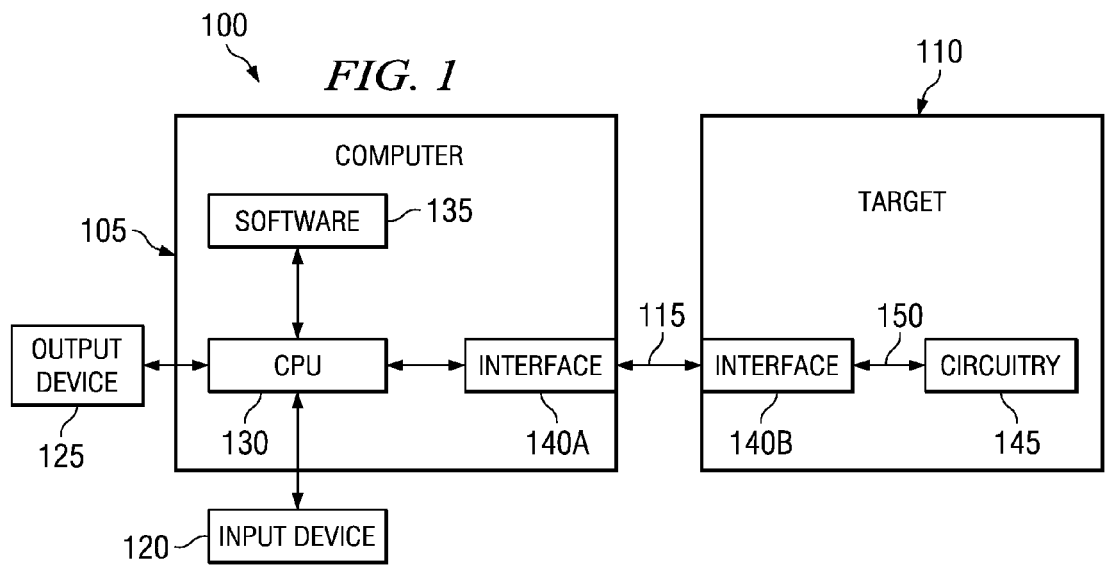
FIG. 1 depicts an exemplary debugging and profiling system in accordance with a preferred embodiment of the invention.

FIG. 1 depicts an exemplary debugging and profiling system 100 including a host computer 105 coupled to a target device 110 through a connection 115. A user may debug and profile the operation of the target device 110 by operating the host computer 105. The target device 110 may be debugged and profiled in order for the operation of the target device 110 to perform as desired (for example, in an optimal manner) with circuitry 145. To this end, the host computer 105 may include an input device 120, such as a keyboard or mouse, as well as an output device 125, such as a monitor or printer. Both the input device 120 and the output device 125 couple to a central processing unit 130 (CPU) that is capable of receiving commands from a user and executing software 135 accordingly. Software 135 interacts with the target 110 and may allow the debugging and profiling of applications that are being executed on the target 110.

Connection 115 couples the host computer 105 and the target device 110 and may be a wireless, hard-wired, or optical connection. Interfaces 140A and 140B may be used to interpret data from or communicate data to connection 115 respectively according to any suitable data communication method. Connection 150 provides outputs from the circuitry 145 to interface 140B. As such, software 135 on host computer 105 communicates instructions to be implemented by circuitry 145 through interfaces 140A and 140B across connection 115. The results of how circuitry 145 implements the instructions is output through connection 150 and communicated back to host computer 105. These results are analyzed on host computer 105 and the instructions are modified so as to debug and profile applications to be executed on target 110 by circuitry 145.

Connection 150 may be a wireless, hard-wired, or optical connection. In the case of a hard-wired connection, connection 150 is preferably implemented in accordance with any suitable protocol such as a Joint Testing Action Group (JTAG) type of connection. Additionally, hard-wired connections may include a real time data exchange (RTDX) type of connection developed by Texas instruments, Inc. Briefly put, RTDX gives system developers continuous real-time visibility into the applications that are being implemented on the circuitry 145 instead of having to force the application to stop, via a breakpoint, in order to see the details of the application implementation. Both the circuitry 145 and the interface 140B may include interfacing circuitry to facilitate the implementation of JTAG, RTDX, or other interfacing standards.

The target 110 preferably includes the circuitry 145 executing code that is actively being debugged and profiled. In some embodiments, the target 110 may be a test fixture that accommodates the circuitry 145 when code being executed by the circuitry 145 is being debugged and profiled. The debugging and profiling may be completed prior to widespread deployment of the circuitry 145. For example, if the circuitry 145 is eventually used in cell phones, then the executable code may be designed using the target 110.

The circuitry 145 may include a single integrated circuit or multiple integrated circuits that will be implemented as part of an electronic device. For example, the circuitry 145 may include multi-chip modules comprising multiple separate integrated circuits that are encapsulated within the same packaging. Regardless of whether the circuitry 145 is implemented as a single-chip or multiple-chip module, the circuitry 145 may eventually be incorporated into an electronic device such as a cellular telephone, a portable gaming console, network routing equipment, etc.

Debugging and profiling the executable firmware code on the target 110 using breakpoints to see the details of the code execution is an intrusive process and affects the operation and performance of the code being executed on circuitry 145. As such, a true understanding of the operation and performance of the code execution on circuitry 145 is not gained through the use of breakpoints.

Figure 2:
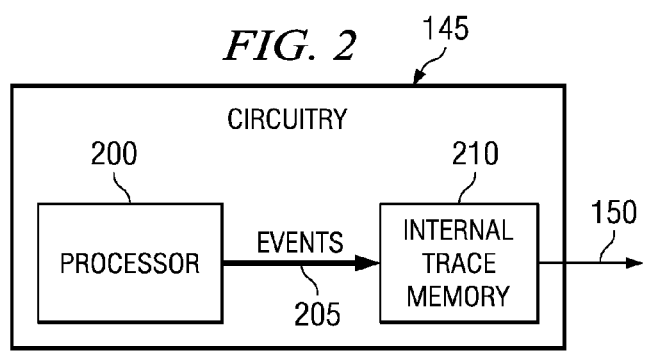
FIG. 2 depicts an embodiment of circuitry where code is being debugged and profiled using a trace.

FIG. 2 depicts an embodiment of circuitry 145 where code is being debugged and profiled using a trace on circuitry 145 to monitor events. Circuitry 145 includes a processor 200 which executes the code. Through the operation of the processor 200 many events 205 may occur that are significant for debugging and profiling the code being executed by the processor 200. The term "events" or "event data" herein is being used broadly to describe any type of stall in which processor 200 is forced to wait before it can complete executing an instruction, such as a CPU stall or cache stall; any type of memory event, such as a read hit or read miss; and any other occurrences which may be useful for debugging and profiling the code being executed on circuitry 145. The internal trace memory 210 records the events 205 as event data and outputs the event data through connection 150 to computer 105. This enables a user of the computer 105 to see how the execution of the code is being implemented on circuitry 145.

As successive generations of processors are developed with faster speeds, the number of events occurring on a processor such as processor 200 similarly increases, however, the bandwidth between computer 105 and circuitry 145 through connection 150 is limited. The amount of event data 205 recorded using a trace may exceed the bandwidth of connection 150. As such, for this solution to be implemented a trace may only be run for a very limited amount of time so as to not fill up internal trace memory 210. This situation is analogous to a sink that drains much less water than the faucet is putting into the sink. In order to prevent the sink from overflowing the faucet may only be turned on for a limited amount of time. This solution of only running the trace for a very short time may not be preferable since it would give a very limited view of the execution of the code on circuitry 145. Alternatively, internal trace memory 210 may be very large so as to accommodate the large amount of event data. This may not be preferable either, since trace memory 210 would then take up a large area on circuitry 145 and consume more power.

Figure 3:
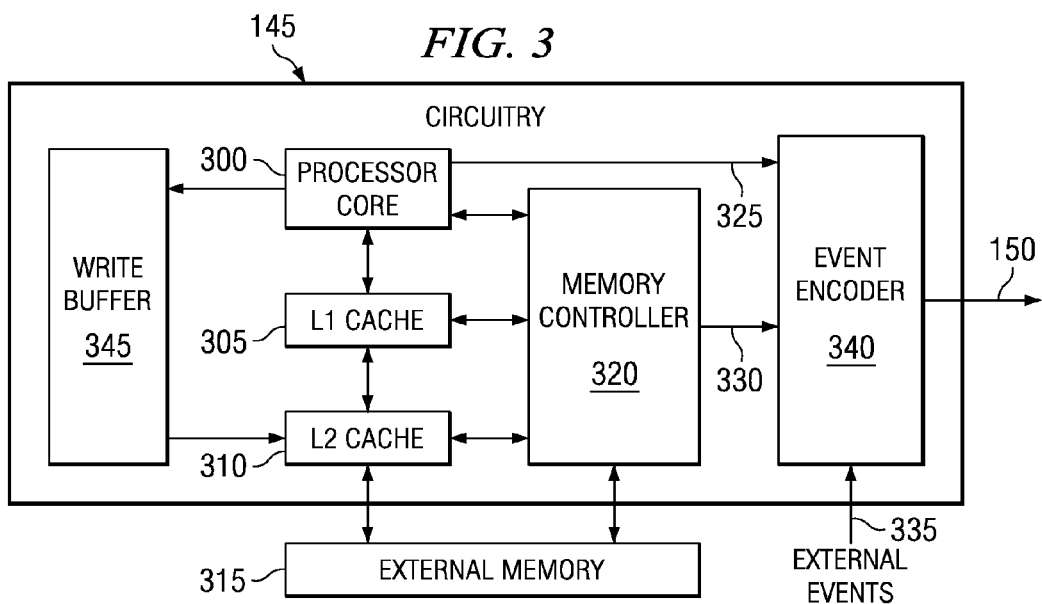
FIG. 3 depicts a preferred embodiment of circuitry where code is being debugged and profiled using a trace.

As such, intelligent ways of reducing the amount of event data without loosing any or much information are desirable. FIG. 3 discloses another embodiment of circuitry 145 where code is being debugged and profiled using a trace on circuitry 145 to monitor events. Circuitry 145 includes a processor core 300 which executes the code. Processor 300 interacts with memory controller 320 in order to input data and instructions from various levels of a memory subsystem and output data manipulated according to the instructions. The memory subsystem may include an L1 cache memory 305, which may be divided into a program portion of L1 cache and a data portion of L1 cache; an L2 cache memory 310, which may be larger and slower than the L1 cache memory; and an external memory 315, which may be a random access memory (RAM), or any other suitable external storage.

The exemplary embodiment of FIG. 3 implements a write-back cache, and any write of data not already within the next lower level of cache after the L1 cache 305 is written to a write buffer 345. Once the data is written to write buffer 345, the core 300 continues processing other instructions while the write buffer 345 is emptied into the L2 cache 310, bypassing the L1 cache 305. Thus, in the embodiment of FIG. 3, core 300 only stalls on write misses to L1 cache 305 when write buffer 345 is full. Write buffer 345 fills up when the rate of writes to write buffer 345 exceeds the rate at which write buffer 345 is being drained. It should be noted that although the example of FIG. 3 shows a write buffer used in conjunction with the L1 cache, such write buffers may also be implemented at any level of a cached memory system, and all such implementations are intended to be within the scope of the present disclosure.

Through executing the code, stalls may occur in the processor core 300 wherein stall signals indicating that these stalls occurred are output from processor core 300 to event encoder 340 through connection 325. Stalls occur when the processor core 300 is forced to wait before it can complete executing an instruction. Stalls can occur for a wide variety of reasons, for example if the processor core 300 has to wait while a data element is being fetched or if the processor core 300 has to wait while an area in cache is being freed up to write the result of an instruction.

Memory controller 320 outputs memory events 330 to event encoder 340. Memory events can also occur for a wide variety of reasons, for example a read hit on the L1 cache 305 or a read miss on the L1 cache 305. Note that certain memory events 330 may also cause a stall, but not all memory events cause a stall. For example a read miss on the L1 cache 305 will also cause a stall until the data that is needed is forwarded to the L1 cache 305. A read hit is an example of a memory event that would not cause a stall.

Table I below provides a non-exhaustive list of memory events that can be monitored in accordance with preferred embodiments of the invention.

TABLE I

EXEMPLARY LIST OF MONITORED MEMORY EVENTS

| MEMORY EVENT | DESCRIPTION |
|---|---|
| L1 Cache Access | Event in which the L1 cache is accessed for read or write, resulting in hit or miss |
| L1 Cache Read Hit | Hit in L1 cache upon read transaction |
| L1 Cache Write Hit | Hit in L1 cache upon write transaction |
| L1 Cache Read Miss | Miss in L1 cache upon read transaction |
| L1 Cache Read Miss + Hits Some Other Storage Space (e.g., L2 Cache, External Memory) | Miss in L1 cache upon read transaction concurrent with hit of the same reference in other part of memory subsystem (e.g., L2 cache, external memory) |
| L1 Cache Write Miss | Miss in L1 cache upon write transaction |
| L1 Cache Write Miss + Write Buffer Not Full | Miss in L1 cache upon write transaction while write buffer is not full |
| L1 Cache Write Miss + Write Buffer Flush | Miss in L1 cache upon write transaction while write buffer is being flushed |
| CPU Bank Conflict | Two parallel CPU accesses to the same memory bank |
| CPU Snoop Conflict | A CPU access and a snoop access occurring simultaneously |
| CPU Cache Coherence Operation Conflict | A CPU access and a cache coherence operation access occur simultaneously |
| L1 Cache Write Miss + Hits L2 Cache | Miss in L1 cache upon write transaction concurrent with hit in L2 cache for same reference |
| L1 Cache Write Miss + Hits External Memory | Miss in L1 cache upon write transaction concurrent with hit in external memory for same reference |

External events 335 may also be input to event encoder 340. External events 335 may include interrupt routines executed on processor core 300 for interacting with external devices. Table II below provides a non-exhaustive list of external events that can be monitored in accordance with preferred embodiments of the invention.

TABLE II

EXEMPLARY LIST OF MONITORED EXTERNAL EVENTS

| EXTERNAL EVENT | DESCRIPTION |
|---|---|
| External Bus Error | An Error occurred on the external memory bus |
| Receive Interrupt | Peripheral indicates that it has received data for processing |
| Transmit Interrupt | Peripheral indicates that it is is ready to transmit data |
| DMA Completion Interrupt | DMA indicates that transfer is complete. |
| Memory Protection Fault | A memory protection fault occurred due to an invalid CPU or DMA access |
| CPU Exception | A CPU exception occurred |

Monitoring external events enables a user of computer 105 to, for example, determine the real-time deadlines for executing the interrupt routines. Event encoder 340 combines and/or selectively outputs the various event data to computer 105 through connection 150. The encoded event data that is sent to computer 105 is decoded and interpreted in order to enable a user on computer 105 to debug and profile the execution of code on circuitry 145. Related application "Method of Translating System Events into Signals for Activity Monitoring", by Swoboda et al. details an exemplary process for decoding the event data. The content of the above referenced application is herein incorporated by reference in its entirety.

In some embodiments, the monitored memory and external events are stored in registers 302 (FIG. 3) in the processor core 300. In other embodiments, the monitored events are stored in memory such as internal trace memory 210 (FIG. 2), L1 cache 305, L2 cache 310, and/or external memory 315 (FIG. 3). In some embodiments the monitored events may be stored in a "native" format meaning such events have not been encoded (such as is described below). In other embodiments, the monitored events are encoded and stored in encoded form. In still other embodiments, each monitored event type may designated for storage in registers 302 or memory (L1 cache, L2 cache, external memory) and may be designated for storage in native or encoded form. As such, some monitored event information is stored in registers in native form, while other monitored event information is stored in memory in encoded form. The designation as to where the event information is stored and the manner in which it is stored (native or encoded) is pre-defined in the circuitry 145 or programmable by a user of computer 105.

Figure 4:
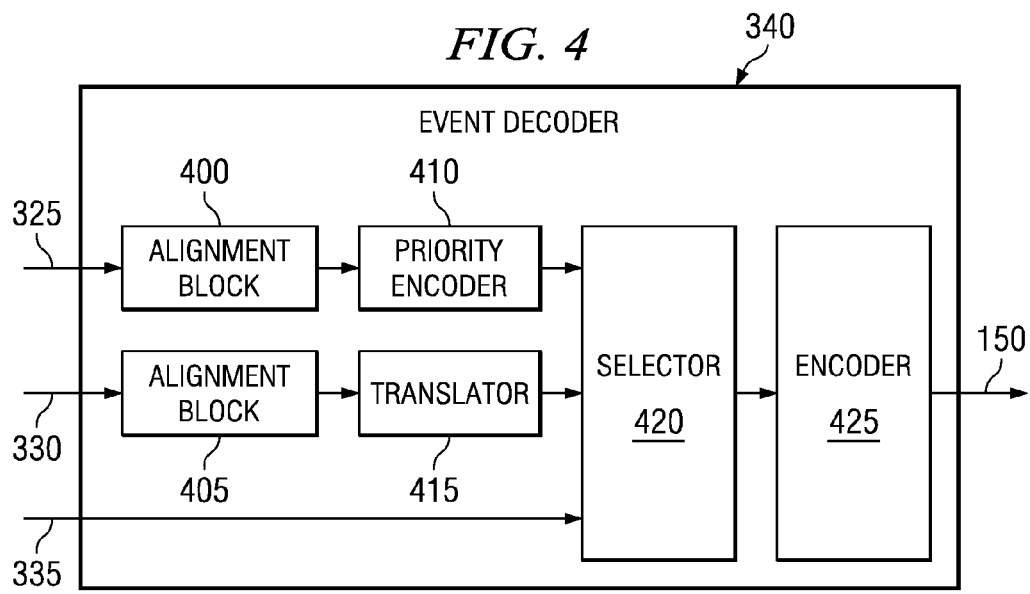
FIG. 4 depicts an example of an implementation of an event encoder.

As noted above, the event information may be encoded. FIG. 4 depicts an example of an implementation of event encoder 340. Event encoder 340 includes alignment blocks 400 and 405, a stall priority encoder 410, an event translator 415, a selector 420, and a data encoder 425. In the embodiment of FIG. 4, alignment blocks 400 and 405 are used for aligning an event to the instruction where the event occurred. Such alignment enables a causal relationship to be determined between code execution and the stalls or events of interest. Priority encoder 410 is used to prioritize groups of stalls for cases where multiple stalls occur simultaneously. In at least one embodiment, only the stall with the highest priority in a particular group is output. Translator 415 is used to group events with common characteristics. Selector 420 selects one of the output from priority encoder 410, the output from translator 415, or the external event 335 input to be provided to encoder 425. Encoder 425 combines or compresses the data selected by selector 420. For example, encoder 425 may include one or more counters to count a number of events occurring within a particular time period. Related application "Watermark Counter with Reload Register", by Swoboda et al. details one such counter implementation. The content of the above referenced application is herein incorporated by reference in its entirety. Encoder 425 may also include standard bit reduction techniques such as Huffman Coding, or any other suitable bit reduction method.

Figure 5A:
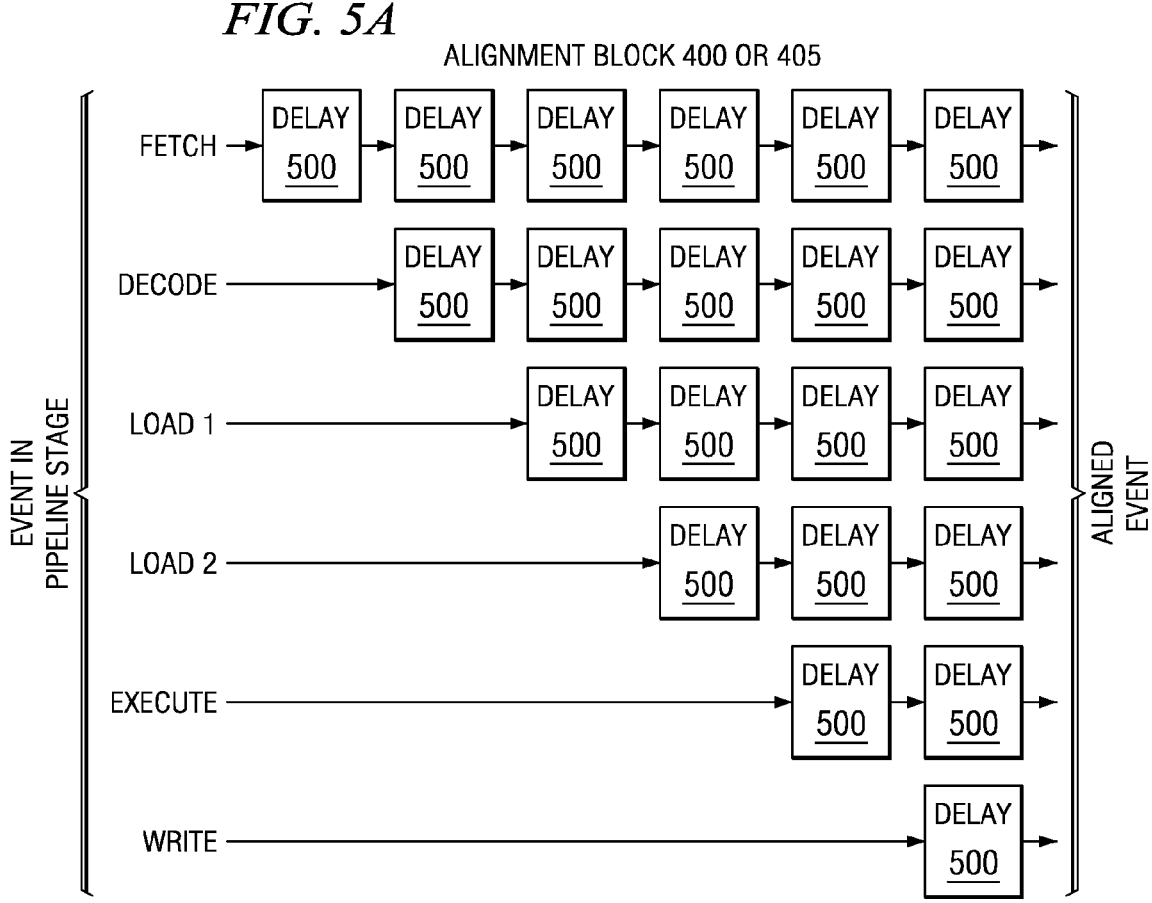
FIG. 5A depicts a preferred implementation of alignment blocks.

FIG. 5A depicts a preferred implementation of alignment blocks 400 or 405. Processors often include processor pipelines for increasing the number of instructions being simultaneously processed by a processor. As such, different phases (fetch, decode, etc.) of multiple instructions may be performed simultaneously by a processor on any given clock cycle. In the example shown in FIG. 5A, a processor that has a six stage pipeline may include a stage for fetching the next instruction, decoding the instruction, loading a first data element, loading a second data element, executing the instruction on the data elements, and writing the result of the execution. For a software debugger to ascertain what is occurring at each phase for any given instruction, the result for each phase of an instruction is fed through a series of delay circuits 500 in the alignment block 400 or 405. For example, since a fetch operation is the first phase in the six stage pipeline, the result of the fetch operation is fed through a series of six delay circuits 500 in order to be aligned with the other stages of that instruction. Similarly, since a write operation is the last phase in the six stage pipeline the result of the write operation is fed through a single delay circuit in order to be aligned with the other stages of that instruction.

FIG. 5B illustrates the implementation of the alignment block 400 or 405. FIG. 5B illustrates a series of eight instructions being executed by processor core 300. In the example of FIG. 5B, processor core 300 (FIG. 3) has most recently completed different stages of the pipeline for multiple instructions. In particular, the processor core 300 has completed the fetch stage for the eighth instruction, the decode stage for the seventh instruction, loading a first data element for the sixth instruction where an event has occurred, loading a second data element for the fifth instruction, executing the fourth instruction, and writing the result of the third instruction. Note that an event that may occur in loading a first data element for the sixth instruction may be, for example, a stall caused by a read miss. The result of each stage is fed into a series of delay circuits 500 in alignment block 400 or 405. As the processor core 300 completes more instructions, the results are propagated through the delay circuits 500 until an aligned instruction is output from the alignment block 400 or 405.

The output of the alignment block 400 or 405 shown in FIG. 5B has aligned all of the stages of the first instruction. Note that an event has occurred for loading a second data element for the first instruction. Thus, the event that occurred is associated with the first instruction and a causal relationship of code execution and the event is made. As such, events are correlated to the instructions where they occurred on a cycle by cycle basis of said processor core 300.

Note that while the above alignment blocks 400 and 405 were described with reference to a processor with a six stage pipeline, a processor with more or less stages in its pipeline may still be used to align the instructions. This may be accomplished by adjusting the number of delay circuits in each stage such that the first stage would have as many delay circuits as the number of stages in the pipeline and each successive stage would have one less delay circuit. Further, while the above alignment blocks 400 and 405 were described as utilizing a series of delay circuits any other known method of aligning the instructions may be used.

FIG. 6 depicts an implementation that is applicable to encoder 410 and translator 415. In particular, for translator 415 the aligned memory events may organized as different logical groups depending on the type of memory event in order to group events with common characteristics. Each logical group would then output only one signal so as to communicate a common memory event characteristic of that group. In this way, less bandwidth is needed to communicate the event information that might otherwise be needed.

For example, memory events may be grouped in one or more memory groups 600, one or more CPU groups 605, or any other logical grouping of memory events. Note that the CPU group 605 may group memory events that are caused by the processor core 300. Through the operation of processor core 300 some memory events may occur on all or most clock cycles. For example, a read hit on the L1 cache may occur on all, or most, clock cycles. As such, without the embodiments of the invention, it would require a relatively large amount of bandwidth to communicate all of the occurrences of these types of memory events. As opposed to outputting a value indicating the occurrence of an event every time a read hit or read miss on the L1 cache occurs, the memory events for the higher level memories may be output and interpreted in order to determine the read hits and misses on the L1 cache. The lower level memory events may occur much less frequently and as such require much less bandwidth. As such, if there are no read hits on the L2 cache or the external memory, then that would mean that a read hit has occurred on the L1 cache. Also, if a read hit on the L2 cache is output, then that would mean that a read miss on the L1 cache has occurred.

For priority encoder 410, the aligned stalls are organized into different logical groups depending on the type of stall in order to set priorities for which stall to output if multiple stalls occur simultaneously. By prioritizing the stalls, more meaning may be extracted from the stall signals. For example, if a read miss occurs then the dirty line in cache may be evicted and replaced with the desired data. This dirty line in cache is referred to as a victim and may be written back to a lower level in memory. As such, two stalls occur simultaneously. One stall indicating a read miss and another stall indicating a victim write-back. If both of these stall types are grouped together and the victim write-back stall is given a higher priority then each of these stalls will be seen as separate stalls. In particular, first the victim write-back stall would be asserted until the dirty line in cache is written back to a higher level in memory. If this stall is being monitored then a determination can be made as to the efficiency of a victim write-back. When this stall is no longer asserted the read miss stall would become visible until the data needed is written in the dirty line in cache. As such, instead of a read miss stall indicating the entire duration of the victim write-back and the time to fill the line in cache, by prioritizing the stalls the read miss gains a new meaning. In particular, the read miss stall indicates the duration of time to fill the line in cache. As such, by prioritizing groups of stalls new meaning and detail may be provided for each stall signal. Related application "Real-time Prioritization of Stall or Event Information" by Sohm et al., describes this process in detail. The content of the above referenced application is herein incorporated by reference in its entirety.

Figure 7B:
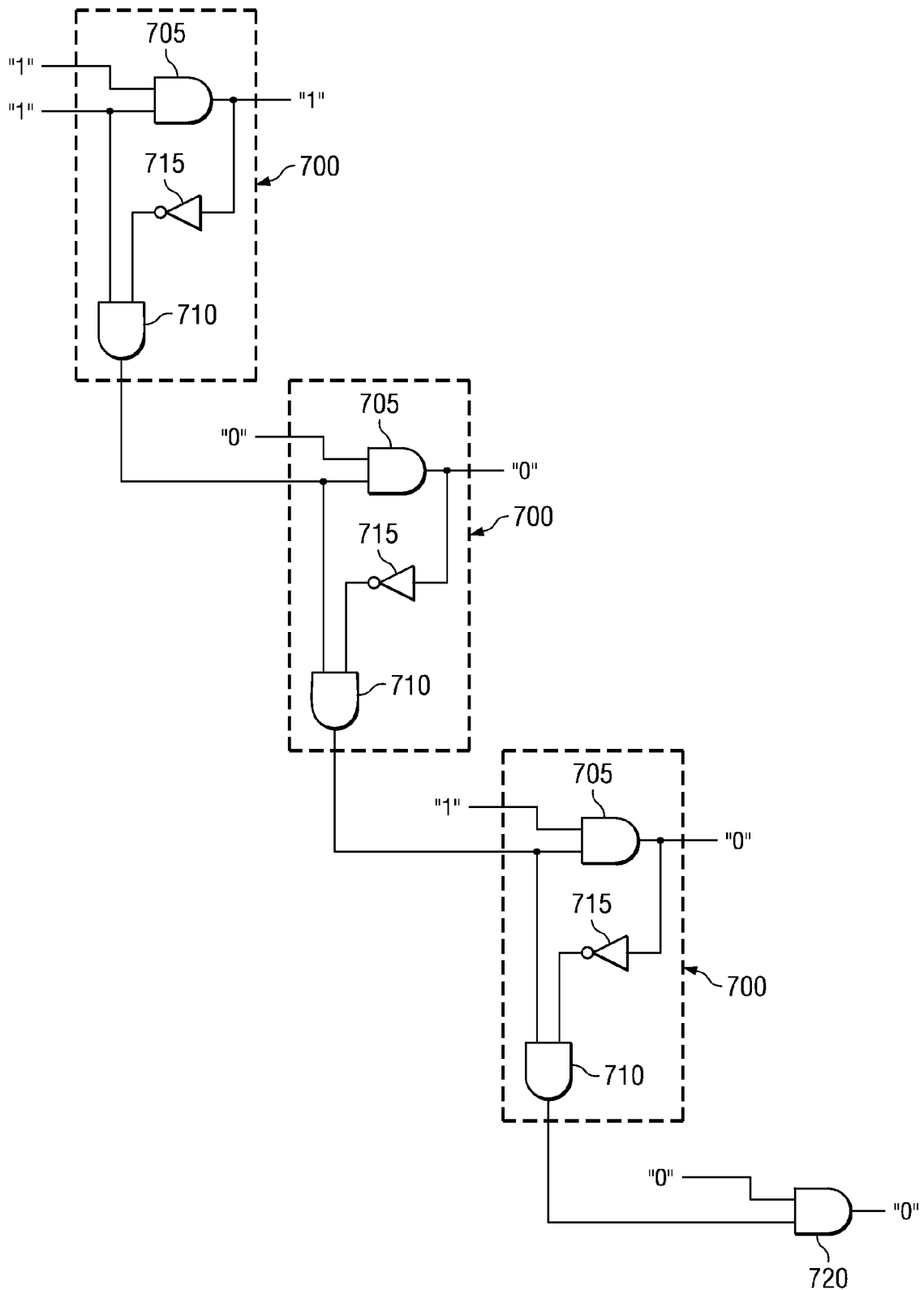
FIG. 7B depicts an example of the operation of FIG. 7A.
Figure 7C:
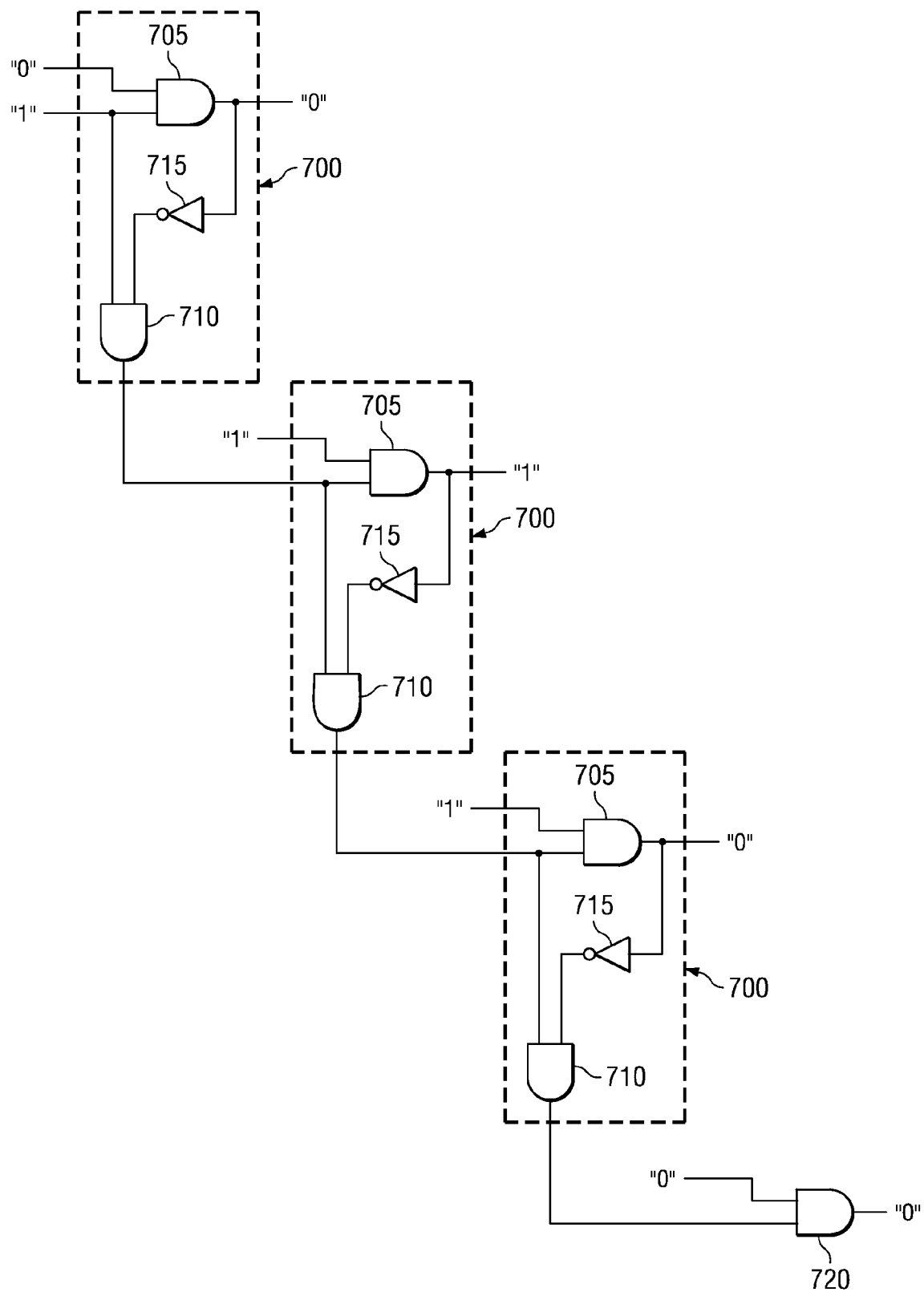
FIG. 7C depicts an example of the operation of FIG. 7A.

FIG. 7A depicts a priority encoder implementation of any of groups 600 or 605. FIG. 7A includes a series of logic blocks 700 where the output from one block is provided as an input to the next. The logic block 700 at the top has the highest priority and the logic block 700 at the bottom has the lowest priority. Each logic block 700 outputs a logical combination of inputs such that if multiple events occur simultaneously, only the highest priority event is visible on the output. In a preferred embodiment, each logic block 700 includes two AND gates 705 and 710 as well as an inverter 715. An AND gate produces a logical ANDing of the inputs to the AND gate. An inverter produces a logical inversion of the input to the inverter. In particular, a logical "1" value is input to both AND gates 705 and 710 of the first logic block 700. AND gate 705 also receives an input from the highest priority event signal. The highest priority event signal indicates whether or not the highest priority event has occurred. A logical "1" would be input to AND gate 705 if the event occurred and a logical "0" would be input to AND gate 705 if the event did not occur. As such, the first logic block 700 will output a value of "0" if the input from the highest priority event signal is "0" since the logical ANDing of a "0" and a "1" produces a "0". Logic block 700 would produce a value of "1" if the input from the highest priority event signal is "1" since the logical ANDing of a "1" and a "1" produces a "1". An inverter 715 inverts whatever signal is output from AND gate 705 and inputs the result as another input to AND gate 710. The output from AND gate 710 from the first logic block 700 is fed into the inputs of AND gates 705 and 710 for the next logic block 700. Each successive logic block 700 receives one input from the next lowest priority event signal and another input from the output of AND gate 710 from the previous logic block 700. For the lowest priority event signal a simple AND gate 720 is used to logically AND the values from the lowest priority event signal and the output of AND gate 710 from the previous logic block 700. FIGS. 7B and 7C illustrate the operation of the operation of the priority encoder.

FIG. 7B depicts the operation of the priority encoder where the highest priority event is occurring simultaneously with third priority event. As illustrated, AND gate 705 produces a "1" output because of the two "1" inputs. Inverter 715 inverts the "1" output from AND gate 705 to produce a "0" input for AND gate 710, therefore AND gate 710 produces a "0" output to the second logic block 700. Both AND gates 705 and 710 for the second logic block receive the "0" input and therefore in turn produce a "0" output. The "0" output from AND gate 710 in the second logic block is input to the third logic block. Similarly, Both AND gates 705 and 710 for the third logic block receive the "0" input and therefore in turn produce a "0" output. Note that even though a "1" is input from the third priority event signal, the logical ANDing of a "0" and a "1" produces a "0". As such, the event occurring on the third priority event signal is masked by the higher priority event occurring on the highest priority event signal. The "0" output from AND gate 710 in the third logic block is fed into AND gate 720 to also produce a "0" output.

FIG. 7C depicts the operation of the priority encoder where the second priority event is occurring simultaneously with third priority event. As illustrated, AND gate 705 produces a "0" output because of the "0" input from the highest priority event signal. Inverter 715 inverts the "0" output from AND gate 705 to produce a "1" input for AND gate 710, therefore AND gate 710 produces a "1" output to the second logic block 700. Both AND gates 705 and 710 for the second logic block receive the "1" input. AND gate 705 for the second logic block 700 produces a "1" output because of the two "1" inputs. Inverter 715 for the second logic block 700 inverts the "1" output from AND gate 705 to produce a "0" input for AND gate 710 of the second logic block 700, therefore AND gate 710 produces a "0" output to the third logic block 700. The "0" output from AND gate 710 in the second logic block is input to the third logic block. Both AND gates 705 and 710 for the third logic block receive the "0" input and therefore in turn produce a "0" output. Note that even though a "1" is input from the third priority event signal, the logical ANDing of a "0" and a "1" produces a "0". As such, the event occurring on the third priority event signal is masked by the higher priority event occurring on the second priority event signal. The "0" output from AND gate 710 in the third logic block is fed into AND gate 720 to also produce a "0" output. As such, the priority encoder only outputs the highest priority event if multiple events in a group occur simultaneously. Since only the highest priority event is asserted then any other lower priority events are not double-counted.

Disclosed above is a system and method of tracing a group of processor events in real-time in order to enable a programmer to debug and profile the operation and execution of code on the processor. This may be accomplished by running one or more traces on the same or different groups of processor events in order to gain a full understanding of how code is being executed by the processor.

While various system and method embodiments have been shown and described herein, it should be understood that the disclosed systems and methods may be embodied in many other specific forms without departing from the spirit or scope of the invention. The present examples are to be considered as illustrative and not restrictive. The intention is not to be limited to the details given herein, but may be modified within the scope of the appended claims along with their full scope of equivalents.

What is claimed is:

1. A data processing apparatus, comprising:
   data processing circuitry configured to execute instructions and produce event data corresponding to events that occur during execution of said instructions, said event data including first and second event data portions respectively indicative of first and second said events;
   an event encoder coupled to said data processing circuitry for jointly interpreting said first and second event data portions together to ascertain additional information about said first event that is unavailable in said first event data portion if said first event data portion is interpreted alone, and encoding said first event data portion to produce encoded event information that is indicative of said first event and differs from said first event data portion by being also indicative of said additional information ascertained by said jointly interpreting; and
   an output coupled to said event encoder for exporting said encoded event information from said apparatus.

2. The apparatus of claim 1, wherein said first event is a memory access event.

3. The apparatus of claim 2, wherein said memory access event includes one of a cache hit, a cache miss, a bank conflict, and a snoop conflict.

4. The apparatus of claim 1, wherein said event encoder includes a selector for selecting between exporting said encoded event information and exporting event data that said selector is configured to receive from a source other than said data processing circuitry.

5. The apparatus of claim 1, wherein said event data corresponds to one of an interrupt, an exception, bus traffic, a bus error, and a memory protection fault.

6. The apparatus of claim 1, wherein said event encoder is configured to correlate respective portions of said event data to respectively corresponding ones of said instructions that prompted production of said event data portions.

7. The apparatus of claim 6, wherein said event encoder is configured for prioritizing said first and second event data portions relative to one another and for producing said encoded event information based on said prioritizing.

8. The apparatus of claim 7, wherein said event encoder is configured to apply data encoding to said encoded event information before said exporting.

9. The apparatus of claim 8, wherein said event encoder includes a selector for selecting between exporting said encoded event information and exporting external event data that said selector is configured to receive from a source other than said data processing circuitry.

10. The apparatus of claim 1, wherein said event encoder is configured for prioritizing said first and second event data portions relative to one another and for producing said encoded event information based on said prioritizing.

11. The apparatus of claim 1, wherein said event encoder is configured to apply data encoding to said encoded event information before said exporting.

12. The apparatus of claim 1, wherein said first event is a caching operation, and said encoded event information is indicative of an amount of time consumed by said caching operation.

13. A method of debugging operation of data processing circuitry, comprising:

using the data processing circuitry to execute instructions and produce event data corresponding to events that occur during execution of said instructions, said event data including first and second event data portions respectively indicative of first and second events;

jointly interpreting said first and second event data portions together to ascertain additional information about said first event that is unavailable in said first event data portion if said first event data portion is interpreted alone;

encoding said first event data portion to produce encoded event information that is indicative of said first event and differs from said first event data portion by being also indicative of said additional information ascertained by said jointly interpreting; and exporting said encoded event information to a destination external to the data processing circuitry.

14. The method of claim 13, including selecting between exporting said encoded event information and exporting event data received from a source other than the data processing circuitry.

15. The method of claim 13, including correlating respective portions of said event data to respectively corresponding ones of said instructions that prompted production of said event data portions.

16. The method of claim 15, including prioritizing said first and second event data portions relative to one another, and wherein said producing includes producing said encoded event information based on said prioritizing.

17. The method of claim 16, including applying data encoding to said encoded event information before said exporting.

18. The method of claim 17, including selecting between exporting said encoded event information and exporting external event data received from a source other than the data processing circuitry.

19. The method of claim 13, including prioritizing said first and second event data portions relative to one another, and wherein said producing includes producing said encoded event information based on said prioritizing.

20. The method of claim 13, including applying data encoding to said encoded event information before said exporting.

* * * * *